Aug. 18, 1942.      R. G. LE TOURNEAU      2,293,510
DRIVE MECHANISM FOR TOOL SLIDES
Filed May 3, 1941      4 Sheets-Sheet 1

INVENTOR.
R.G.LeTourneau
BY
ATTORNEYS

Aug. 18, 1942.   R. G. LE TOURNEAU   2,293,510
DRIVE MECHANISM FOR TOOL SLIDES
Filed May 3, 1941   4 Sheets-Sheet 4

INVENTOR.
R. G. LeTourneau
BY
ATTORNEYS

Patented Aug. 18, 1942

2,293,510

UNITED STATES PATENT OFFICE 2,293,510

DRIVE MECHANISM FOR TOOL SLIDES

Robert G. Le Tourneau, Peoria, Ill., assignor to R. G. Le Tourneau, Inc., a corporation Application May 3, 1941, Serial No. 391,736

9 Claims. (Cl. 82—24)

This invention relates in general to the machine tool art, and in particular the invention is directed to, and it is my principal object to provide, an improved drive mechanism for advancing and retracting the quill of a lathe.

Another object of the invention is to provide a drive mechanism for the tool holding quill arranged to function to advance the quill at a given speed, and to retract the quill first and momentarily at a relatively slow speed and subsequently at a substantially greater speed.

An additional object of the invention is to provide a drive mechanism for the tool holding quill operative to first retract the quill only sufficient to free the tool, then permit a short dwell, and subsequently continue such retraction at a relatively greater speed.

This invention represents modifications of the drive mechanism connected between the electric motor and quill in the tool slide shown in my U. S. Letters Patent No. 2,105,744, dated January 18, 1938.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
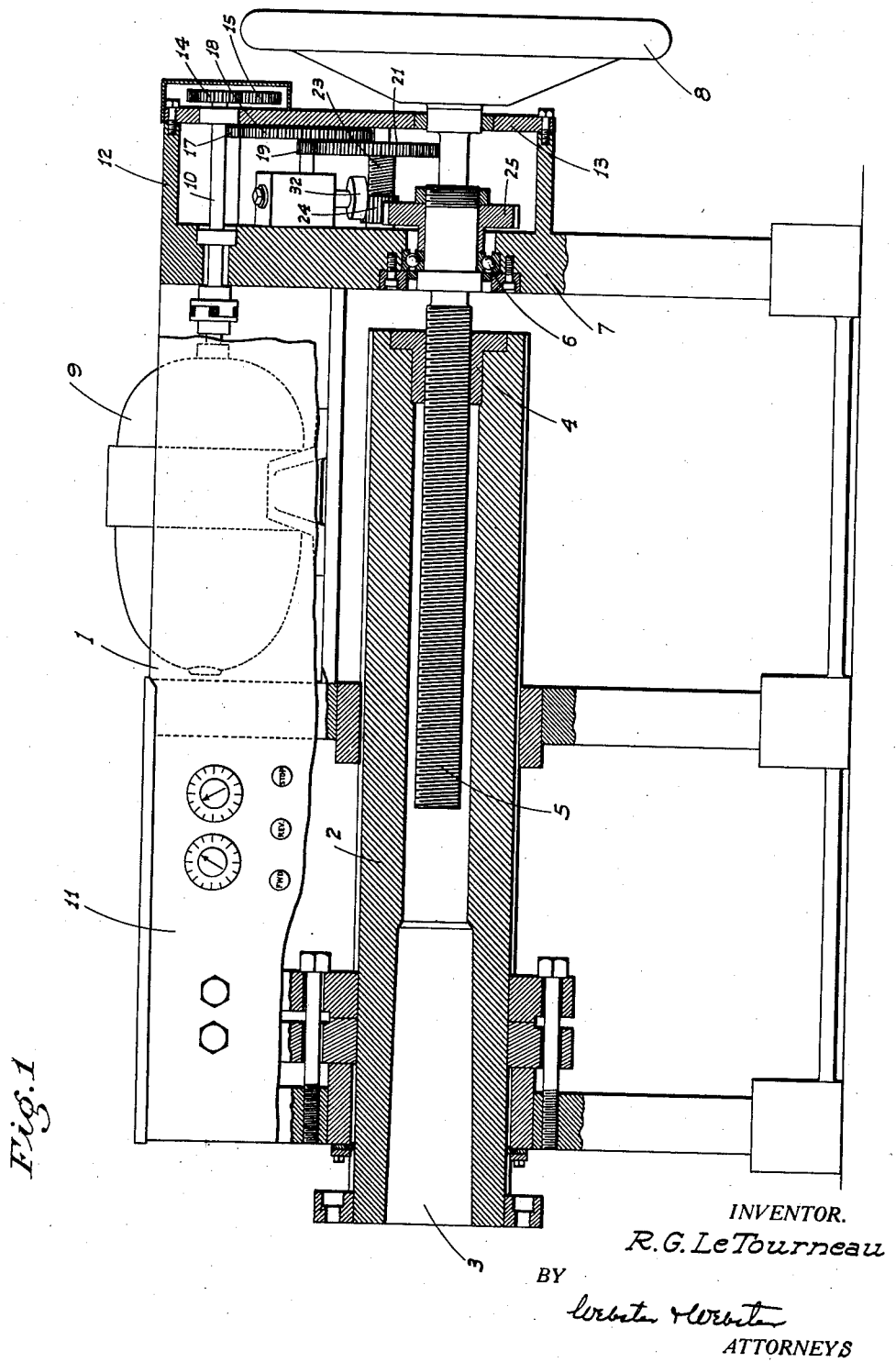
Figure 1 is a sectional elevation of the drive mechanism as embodied in a lathe tool slide.

Referring now more particularly to the characters of reference on the drawings, the tool slide includes a rigid housing 1 adapted to be secured to the bed of the lathe (not shown). A tool holding quill 2 is mounted in the housing for longitudinal sliding movement and is splined lengthwise to prevent rotation thereof; the outer end of the quill having a taper socket 3 to receive the tool in the usual manner. The quill is tubular, and at its rear end is fitted with a nut 4 through which a screw spindle 5 is threaded. The outer end of spindle 5 extends through a thrust bearing 6 in axially immovable but rotatable relation; such bearing being mounted in a vertical wall 7 of the housing. Beyond wall 7 and spaced therefrom spindle 5 is fitted with a hand wheel 8. It will be seen that upon rotation of spindle 5 in one direction or the other, the quill is advanced or retracted. It is the mechanism for driving spindle 5 to which this invention relates.

An electric motor 9, of reversing type, is mounted in the housing 1 above quill 2, but with its axis parallel to spindle 5; the motor shaft 10 extending through wall 7 and some distance therebeyond. The motor controls are located in box 11, which includes the hand switches for starting, stopping, and reversing the motor, and automatic switches, if employed.

The drive mechanism between shaft 10 and spindle 5 comprises the following gearing arrangement, all of which is enclosed within a gear box 12 which includes wall 7 and another rigid wall 13 disposed in parallel but spaced relation thereto, and between which walls the gear shafts are journaled.

A drive pinion 14 is fixed on the outer end of motor shaft 10 and meshes with a gear 15 which drives a counter shaft 16. A pinion 17 on counter shaft 16 leads a speed reducing gear train which includes a gear 18 and a pinion 19 on cross shaft 20, and a gear 21 on cross shaft 22. Axially of gear 21, shaft 22 is formed as a multiple thread, fast lead screw 23 on which is threaded a pinion 24. A drive gear 25 is fixed on spindle 5 within gear box 12 and in the vertical plane of screw 23 but adjacent the end thereof opposite gear 21; pinion 24, when at said end of the worm gear, meshing with drive gear 25.

The above described gear train is operative to retract the quill from the work at relatively high speed, after the initial and slight slow speed retraction of the quill has been imparted thereto, as will hereinafter be described in detail.

A supplemental gear train, which is operative to effect the relatively slow speed advance of the quill and tool comprises a gear 26 disposed to mesh with pinion 24 when the latter is at the end of screw 23 adjacent gear 21; the cross shaft 27 for gear 26 carrying a pinion 28 meshing with a gear 29 whose cross shaft 30 is fitted with a pinion 31 in constant mesh with drive gear 25 for spindle 5.

A spring pressed drag shoe 32 frictionally engages pinion 24 at all times whereby to assure reversing travel thereof as the direction of rotation of drive motor 9 and worm 23 is reversed.

Operation

Figure 2:
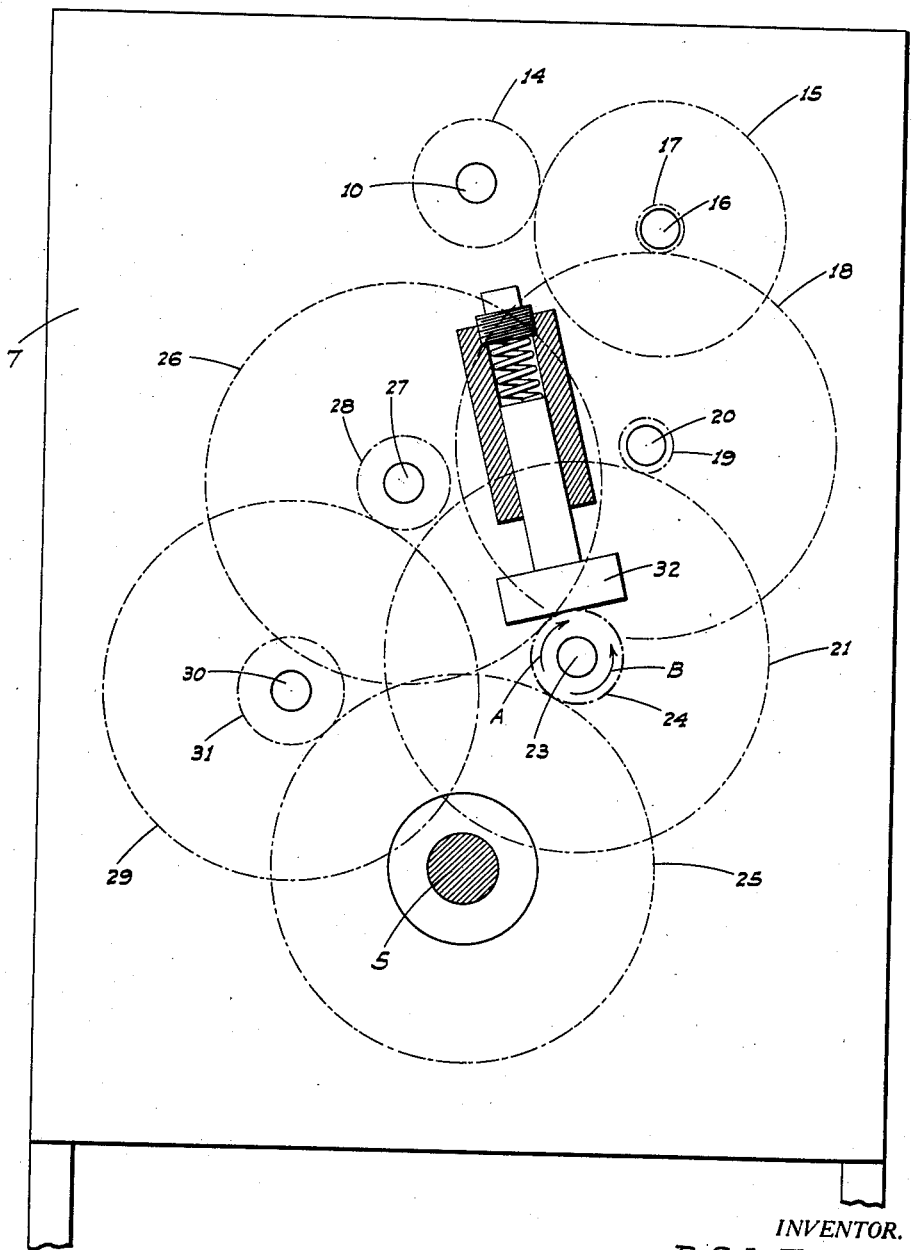
Figure 2 is a diagrammatic end view of the gear trains which are included in the mechanism.
Figure 3:
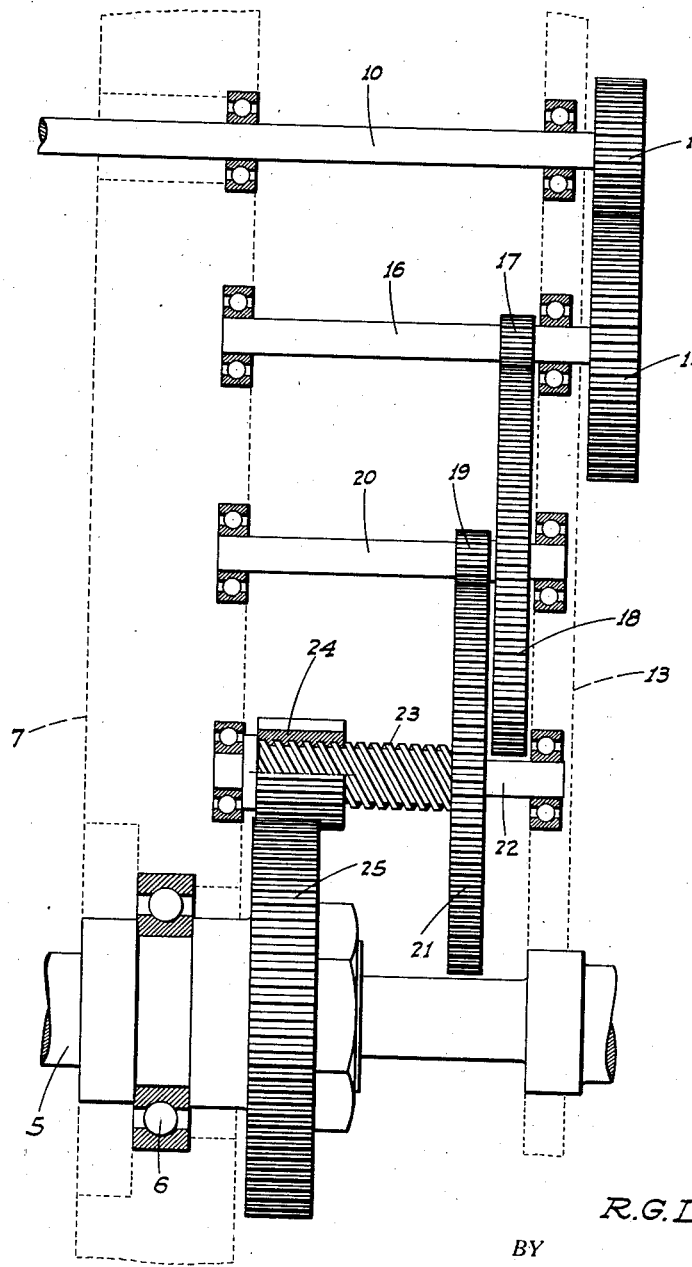
Figure 3 is a somewhat diagrammatic plan view of the gear train which is operative to retract the quill.
Figure 4:
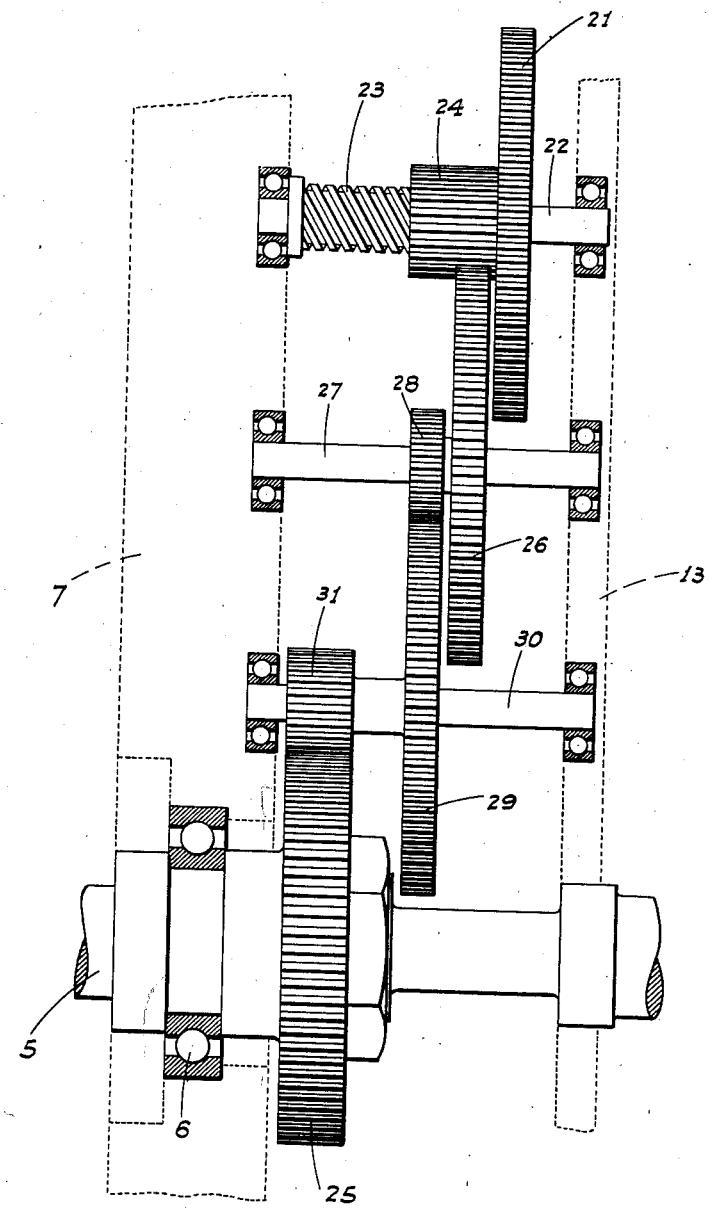
Figure 4 is a somewhat diagrammatic plan view of the other or supplemental gear train which effects the relatively slow advancing movement of the quill, and initially retracts the same a slight distance.

To advance the quill 2, the motor is actuated to rotate the screw 23 in a direction to cause pinion 24 to shift in a direction toward gear 21 and out of mesh with drive gear 25 but into mesh with gear 26 of the supplemental train; such direction of rotation of the screw 23 being indicated by the arrow identified by the reference letter A in Fig. 2. When pinion 24 and gear 26 are thus in driving relation, spindle 5 rotates, by reason of said supplemental train of gears between pinion 24 and gear 25 and which includes gear 26, in a direction to advance nut 4 and tool holding quill 2 toward the work and at a relatively slow speed; the gear train of Fig. 3 and the supplemental train of Fig. 4 being then both used.

When it is desired to retract the quill and tool away from the work, motor 9 is run in a reverse direction which causes the following sequence of action.

At the outset, and with pinion 24 still in mesh with drive gear 26, the quill and tool retracts a slight distance from the cut and at a relatively slow speed. However, a moment after the start, this reverse direction of rotation of screw 23, as indicated by the arrow identified by the reference letter B in Fig. 2, causes pinion 24 to shift out of mesh with gear 26, whereupon spindle 5 and quill 2 remain stationary or dwell for an instant because the supplemental gear train is then disconnected from the motive power. However, pinion 24 quickly meshes with gear 25, whereupon retracting movement of the quill resumes and at a substantially greater speed, as is desirable once the tool has left or been freed from the cut. This increase in speed of retraction is due to the fact that the supplemental gear train, which is a speed reducing train, is then cut out or disconnected from the motor even though still rotating due to the permanent engagement of pinion 31 with gear 25. After the quill is fully retracted, motor 9 is stopped and the apparatus is ready for another cycle of operations.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a tool slide which includes a movable quill, an element rotatable in one direction to advance the quill and in the opposite direction to retract the quill, a reversible motor, and drive connections between said motor and element; said drive connections comprising a motor driven train of gears, a speed reducing train of gears, and means functioning with rotation of the motor at a given speed in one direction to couple said motor driven train of gears with said element in driving relation, and functioning with rotation of the motor at said speed in a reverse direction to couple the speed reducing train between said motor driven train and said element.

2. In a tool slide which includes a movable quill, an element rotatable in one direction to advance the quill and in the opposite direction to retract the quill, a reversible motor, and drive connections between said motor and element; said drive connections comprising a motor driven train of gears, a separate speed reducing train of gears arranged in driving relation with said element, and means dependent upon direction of rotation of the motor and functioning upon operation thereof to connect said motor driven train of gears in driving relation with said element or with said speed reducing train of gears, respectively.

3. In a tool slide which includes a movable quill, an element rotatable in one direction to advance the quill and in the opposite direction to retract the quill, a reversible motor, and drive connections between said motor and element; said drive connections comprising a motor driven train of gears, a separate speed reducing train of gears, the motor driven train of gears being in driving relation with said element upon rotation of the motor in a direction to retract the quill, and means functioning with rotation of the motor in a reverse direction to connectedly interpose said speed reducing train of gears between the motor driven train and said element.

4. In a tool slide which includes a movable quill, an element rotatable in one direction to advance the quill and in the opposite direction to retract the quill, a reversible motor, and drive connections between said motor and element; said drive connections comprising a motor driven train of gears including a drive pinion disposed for limited axial movement, a separate speed reducing train of gears arranged in driving relation with said element, and means dependent upon direction of rotation of said motor driven train of gears and functioning upon operation thereof to move said pinion axially in one direction and connect said pinion in driving relation with said element or to move said pinion axially in the opposite direction and connect the latter with said speed reducing train, respectively.

5. In a tool slide, a slidable quill, means including a main gear rotatable in one direction to advance the quill and rotatable in the other direction to retract the quill, a reversible motor, and drive connections between said motor and gear; said drive connections comprising a motor driven train of gears including a screw and a pinion threaded on said screw for axial movement thereon, said pinion when adjacent one end of the screw being in mesh with said main gear, a separate and speed reducing train of gears including another pinion in mesh with said main gear, said first named pinion when adjacent the other end of the screw being in mesh with the lead gear of said speed reducing train, and means to cause said first named pinion to traverse the screw in alternate directions upon alternation of the direction of rotation of said screw.

6. In a tool slide, a slidable quill, means including a main gear rotatable in one direction to advance the quill and rotatable in the other direction to retract the quill, a reversible motor, and drive connections between said motor and gear; said drive connections comprising a motor driven train of gears including a screw and a pinion threaded on said screw for axial movement thereon, said pinion when adjacent one end of the screw being in mesh with said main gear, a separate and speed reducing train of gears including another pinion in mesh with said main gear, said first named pinion when adjacent the other end of the screw being in mesh with the lead gear of said speed reducing train, and a drag element engaging said first named pinion to cause the same to traverse the screw in alternate directions upon alternation of the direction of rotation of said screw.

7. An assembly as in claim 6 in which said drag element comprises a spring pressed shoe engaging the face of said first named pinion.

8. In a tool slide which includes a movable quill, an element rotatable in one direction to advance the quill and in the opposite direction to retract the quill and a reversible drive motor; drive means connectible between the motor and element to rotate the latter in a quill advancing direction and at a relatively slow speed and adapted to function upon rotation of the motor at a given speed in one direction, other drive means connectible between the motor and element and included in part with said first named drive means and adapted to function upon rotation of the motor in the opposite direction at said speed to rotate the element in a quill retracting direction at a relatively high speed, and automatic means included with both said drive means and connecting the first named drive means with the motor when the latter is rotating in said one direction and functioning upon reversal of direction of the motor to initially retain the motor in connection with the first named drive means and to then disconnect the motor from the first named drive means and connect the same with said other drive means.

9. A structure as in claim 8, in which said automatic means is arranged to cause a momentary dwell of the element between the disconnection of the motor from the first named drive means and the connection of the motor with said other drive means.

ROBERT G. LE TOURNEAU.